(12) United States Patent
Dutta et al.

(10) Patent No.: US 8,397,210 B2
(45) Date of Patent: Mar. 12, 2013

(54) EVOLVING THE ARCHITECTURE OF A SOFTWARE APPLICATION

(75) Inventors: Suhail Dutta, Kirkland, WA (US); David N. Trowbridge, Enumclaw, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/132,050

(22) Filed: Jun. 3, 2008

(65) Prior Publication Data

US 2009/0300579 A1    Dec. 3, 2009

(51) Int. Cl.
G06F 9/44    (2006.01)

(52) U.S. Cl. .................................. 717/104; 717/105

(58) Field of Classification Search ........... 717/104–105
See application file for complete search history.

(56) References Cited

U.S. PATENT DOCUMENTS

| | | | |
|---|---|---|---|
| 6,968,535 B2 | 11/2005 | Stelting et al. | |
| 7,047,518 B2 | 5/2006 | Little et al. | |
| 7,082,386 B2 | 7/2006 | Srinivasa | |
| 7,191,429 B2 | 3/2007 | Brassard et al. | |
| 7,571,434 B1 * | 8/2009 | Kamen et al. | 717/154 |
| 2005/0137718 A1 | 6/2005 | Cobb et al. | |
| 2005/0262473 A1 | 11/2005 | Kocka | |
| 2006/0129976 A1 | 6/2006 | Brand et al. | |
| 2006/0168577 A1 | 7/2006 | Melo et al. | |
| 2007/0061354 A1 | 3/2007 | Sarkar et al. | |
| 2007/0288222 A1 * | 12/2007 | Eilam et al. | 703/22 |
| 2007/0288885 A1 | 12/2007 | Brunel et al. | |

OTHER PUBLICATIONS

Riva, "UML-based Reverse Engineering and Model Analysis Approaches for Software Architecture Maintenance", Sep. 11-14, 2004, IEEE, ICSM04, p. 1-10.*
Wagenhals, "Synthesizing Executable Models of Object Oriented Architectures", Jun. 2002, Australia Computer Society, Inc, vol. 12, p. 1-9.*
Kruchten, Architectural Blueprints—The '4+1' View Model of Software Architecture, Nov. 1995, IEEE, p. 1-15.*
Jeff Garland, "Representing Software Architectures for Large Scale Systems", Aug. 10, 2001, Crystal Clear Software, Inc., pp. 1-6.
Philippe Kruchten, "Architectural Blueprints—The "4+1" View Model of Software Architecture", Nov. 1995, IEEE Software, vol. 12, Issue No. 6, p. 42-50.

* cited by examiner

*Primary Examiner* — Li B Zhen
*Assistant Examiner* — Duy Khuong Nguyen

(57) ABSTRACT

The logical architecture of an existing or target application or software system is modeled in the form of one or more architecture diagrams. The existing and target diagrams may be compared. A diagram may be modified by associating physical artifacts from an architecture discovery system or by selecting artifacts identified via a query statement. Rules are associated with the diagrams and validation performed based on the rules and the physical artifacts associated with the diagrams. A report may be produced facilitating further modifications to evolve the architecture represented by the diagrams to the target architecture.

20 Claims, 5 Drawing Sheets

EVOLVING THE ARCHITECTURE OF A SOFTWARE APPLICATION

BACKGROUND

When a software architect or a software developer joins a development team, he or she has to understand the basic organization of the physical artifacts that make up the software system whether the task is fixing bugs, modifying the system towards new business ventures, or modifying the system to accommodate a new technology platform. A logical model of a software system is sometimes constructed showing layers of logical elements. These diagrams represent part of what is often referred to as the "logical architecture" of the system.

Architecture diagrams are typically developed by meeting with other architects, developers and/or business people on the team, by referring to existing documentation, and by drawing free-form drawings on whiteboards and paper. Inaccurate diagrams frequently result because the participants have an incorrect or incomplete knowledge of the system, because documentation is incorrect, incomplete or outdated and because the views represented by the diagrams are abstract models of the underlying system. Moreover, even if correct and complete at some point in time, the diagrams developed in this way are likely to become incorrect or outdated as the system changes.

SUMMARY

The logical architecture of an existing or proposed application or software system is presented in the form of one or more architecture diagrams where each diagram groups together model elements that have a particular purpose or responsibility in the application or software system. Model elements represented in the architecture diagrams may be directly or indirectly linked to one or more physical artifacts. The architecture diagrams representing the logical architecture of an existing or proposed application or software system may also show dependencies between the layers represented in the diagrams.

An architecture diagram may be created using a diagram designer. An architecture diagram can model the logical architecture of an existing application or software system or it can model the logical architecture of a proposed or target application or software system. The diagram designer is interactive, accepting user input to create the diagram, to specify dependencies of the model elements of the diagram(s), to associate physical artifacts with model elements, to define rules, to validate the diagrams, to display metrics and so on. The diagrams created in the diagram designer can be used to model an application or software system and can be used to communicate the structure and function of the application or software system to others, validate the structure depicted by the architecture diagram and evolve an existing architecture to a proposed architecture for a new or modified application or software system. Abstract/logical groups depicted in the diagrams may be connected to physical artifacts using a query statement to identify the physical artifacts to be linked to the model elements of the diagram or by user gestures which associate physical artifacts exposed by one or more architecture discovery systems. Rules and constraints may be defined and can be associated with the model elements in the diagrams. Running validation defined in the architecture diagram(s) against the physical system helps in enforcement by generating constraint violations and work items which may be used to guide development towards evolving an existing architecture to a target architecture.

Architectural diagrams modeling the application or software system may include one or more layer diagrams. A layer diagram may be a block and line diagram that allows a system architect or other user to specify the architectural layers of an existing or of a proposed application or software system. The layer diagrams can be used to define and communicate aspects of the application to others in an easy-to-understand fashion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
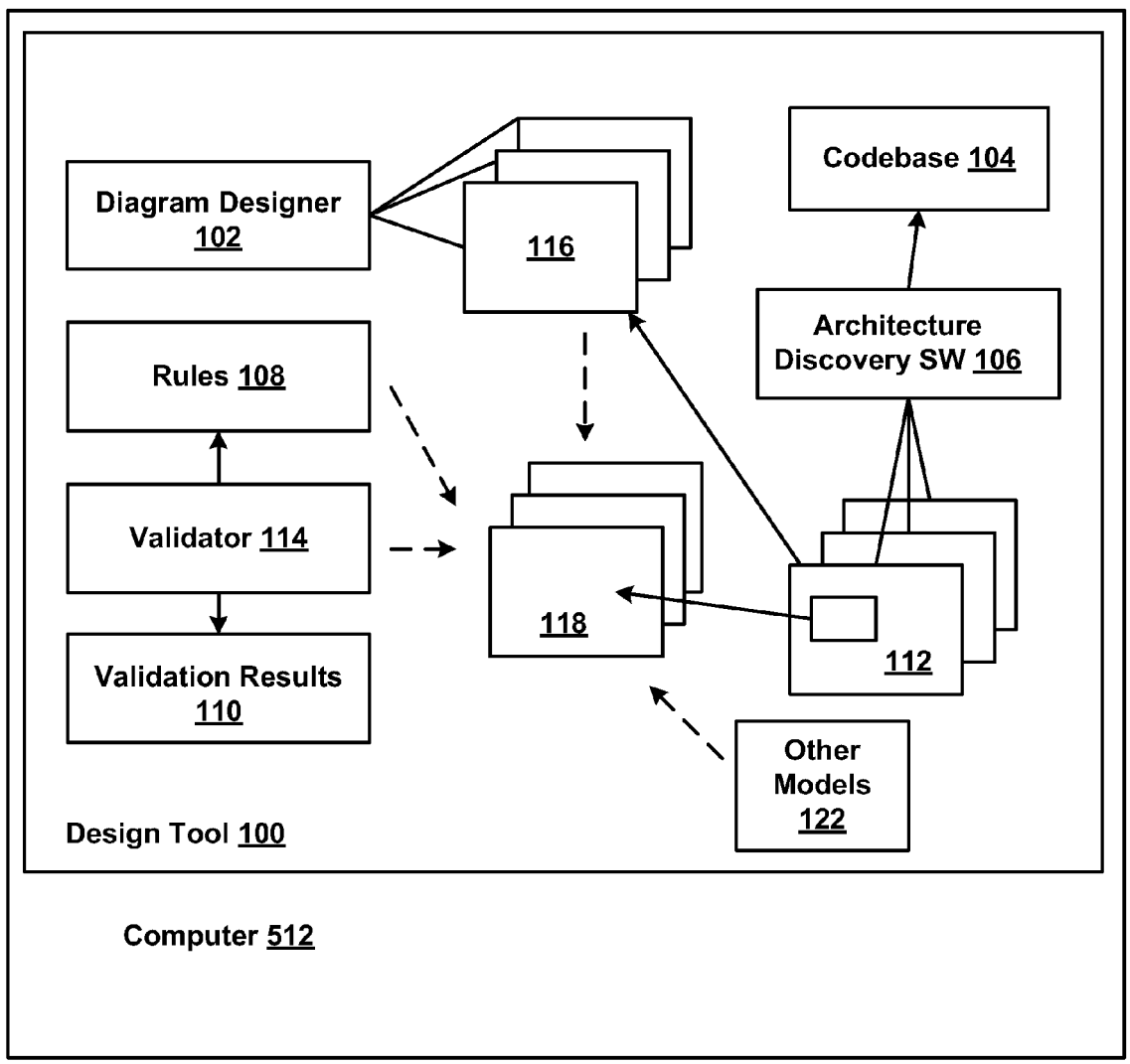
FIG. 1a is a block diagram of an example of a system for evolving the architecture of a software application in accordance with aspects of the subject matter disclosed herein.

One limitation to the traditional approach of creating views of the architecture of an application or software system is that because the view is not connected to the physical artifacts of the system, the view is a disconnected abstract model and is prone to inaccuracies and to becoming outdated. A user may not be able to easily determine the physical artifacts of the system or be able to view the physical artifacts in the context of the view, making it more difficult to understand how the physical artifacts of the system interact. Typically the developer relies on documentation external to the views to guide development. In the absence of a connection from the view to physical artifacts modeled in the view, validation may be difficult. An analysis of the impact of changes may not be readily discernable. A user may not be able to easily understand the intent of a change, the costs associated with a change, or understand how a particular change will affect other parts of the architecture.

In accordance with aspects of the subject matter disclosed herein, one or more architecture diagrams can be created that are easy to understand and use and that allow a user to define any aspect of the architecture of an existing or proposed application or software system. He or she may be able to do so without being constrained by the expectations of formal modeling languages such as Unified Modeling Language (UML), Integration Definition Language (IDEF), System Modeling Language (SysML), Business Process Modeling Lanugage (BPML), or other modeling languages. In accordance with other aspects of the subject matter disclosed herein, a modeling language including but not limited to the modeling languages listed above may be used. Physical artifacts in an existing application or software system can be associated or linked directly or indirectly with model elements such as but not limited to layers represented in the architecture diagrams modeling a target logical architecture. Furthermore, the association of physical artifacts with the model elements of the architecture diagrams may be automated, that is, performed programmatically, so that the diagrams of the logical architecture can be inferred programmatically from the application or software system.

A design tool is provided that facilitates generation of a set of architecture diagrams facilitating the evolving of an actual existing software architecture to a proposed architecture, where each particular model element represented by the diagram of the set of architecture diagrams can be linked to physical artifacts. One or more physical artifacts can be directly linked to a model element represented by an architecture diagram by providing a search query performed over the physical artifacts of a system that identifies physical artifacts that satisfy the search query. Physical artifacts can likewise be linked by selecting physical artifacts by user gestures including but not limited to drag-and-drop operations or can be linked by the diagram designer when the diagram designer generates the diagram(s). Thus the at least one architecture diagram as described herein can serve as an aid in communication and in navigation of the code, can facilitate architectural evolution by allowing the user to assign architectural rules or constraints to each of the diagrams in the set of architectural diagrams and then validating the architectural design by applying the rules associated with the diagrams to the actual physical artifacts. Discrepancies may appear on a validation report. Validation using the user-specified rules for each layer can be run when the set of architecture diagrams is being used, when code is checked into a source code control system or whenever a build is performed (during compilation and/or deployment). The systems, methods and program instructions described herein can be used to evolve an application from an existing application or software system to a proposed or target architecture and can also be used to guide development teams during subsequent application development.

Various quality metrics can be viewed at an abstract or logical level to make informed decisions about revising and refactoring existing software. Examples of quality metrics may include code coverage, bug numbers, fix rates and so on. Metrics like these may facilitate understanding the hidden costs associated with making modifications to particular parts of the application or software system. The metrics and dependencies between the model elements of the diagrams can be used to understand the impact of changes in a model element in one diagram on the system. The above described features may be particularly useful in software systems in which applications are provided as services or in data driven systems, where traditional means of analyzing the codebase does not reveal dependencies.

Evolving the Architecture of an Application or Software System

FIG. 1a illustrates a block diagram of a system for evolving the architecture of an application or software system in accordance with aspects of the subject matter disclosed herein. Design tool 100 may include one or more of the following: a diagram designer 102 that creates architecture diagrams reflecting a user's perception of an existing application or software system 116 and architecture diagrams reflecting a proposed or target application or software system 118, a codebase 104, architectural discovery software 106 that is run on an existing codebase to programmatically generate information about physical artifacts 112, other models and model elements 122, a set of rules or constraints 108, a validator 114 (e.g. validation software) and validation results 110. Design tool 100 or portions thereof may reside on one or more computers connected via a network as described below with respect to FIG. 3. System 100 may comprise a portion of an integrated development environment such as the one described with respect to FIG. 4 or may be implemented as a stand-alone system or as a plug-in.

A diagram designer such as diagram designer 102 can receive input from a user such as a system architect, development team leader, programmer or other user or groups of users (collectively the participants) to create or modify at least a first diagram comprising the entire or a portion of a set of architecture diagrams that together represent what is believed to be the logical architecture of an existing application or software system. Existing documentation as well as information known by the participants may be used to create these architecture diagrams. A diagram so created can be modified to support proposed projects that may have different system requirements than those of the existing application or software system, representing a target architecture. In addition, existing templates providing best practice information may be used to develop the original and modified diagrams.

An architectural discovery system 106 may be run against an existing codebase 104 to analyze the existing codebase. One or more architecture discovery systems may derive and provide architecture information to the layer designer 102 to create one or more architecture diagrams representing an existing application or software system based on physical artifacts of an actual codebase. A codebase refers to the collection of source code and code elements used to build a particular application or portion of an application or software system. A physical artifact may be a document, a class, a project, an assembly, a namespace, a program or any physical code element. The architectural discovery system software may derive information about physical artifacts including but not limited to class stacks, class namespaces, attributes of classes and so on, providing sufficient information to the diagram designer to permit the diagram designer to link the diagram under construction to identified physical artifacts. An architecture discovery system 106 may also provide information about available models and model elements that can be linked to the model elements of the diagram(s).

The information generated by the architecture discovery system 106 may be exposed to the user in the form of diagrams of structures showing the relationships between the physical artifacts. The information generated may be provided to diagram designer 102 to create a set of diagrams modeling an actual existing codebase, or to provide a series of diagrams or visualization of physical artifacts and their relationships to each other to the user. Architectural discovery system 106 may include various tools that can be used to analyze the codebase to determine an actual existing architectural structure. Contemplated tools include but are not limited to tools available in integrated development environments such as Microsoft's Visual Studio, IBM's Rational Software Architect, Borland's Together Visual Modeling for Software Architecture Design, etc., or other tools such as Windows Explorer, Team Foundation Server Explorer, and others. For Visual Studio, these tools may include Visual Studio's Solution Explorer, the class browser and other well-known tools. A Solution is a set of source code files and other resources that are used to build an application or software system. The files in a Solution may be presented visually in a hierarchy that may reflect the physical organization of the files in the file system. Visual Studio's Solution Explorer may be used to manage and browse the files in a Solution.

As described above, architectural discovery system 106 may provide information to the diagram designer 102 from which the diagram designer 102 may generate a set of one or more architecture diagrams. The resulting set of architecture layer diagrams can be compared to the set of architecture diagrams produced by the diagram designer 102 from input provided by the system architect, etc. using information from the participants and available documentation. Comparison, whether performed manually or by software features may lead to the realization that the existing application or software system is not architected as was thought, or is not architected in a way that supports the proposed application or software system.

One or more architecture diagrams produced by the diagram designer in response to user input, from information provided by an architecture discovery system or by a combination of both, may be modified to create a target architecture or evolve an existing architecture to a target architecture. Similarly a new set of diagrams based on existing sets of architecture diagrams can be created using the diagram designer 102. Physical artifacts can be associated with the model elements of the architecture diagrams. Physical artifacts include physical files, sequence diagrams, component diagrams, portions of program code, code elements, classes, namespaces, documents, projects and so on. Physical artifacts can be directly or indirectly linked or associated with the model elements in the diagrams.

Physical artifacts to be directly linked to a model element can be identified using queries or query statements. That is, a query can be used to identify the physical artifacts to be associated with a particular model element on the diagram. For example, a query can be used to indicate that a particular layer includes the classes that start with a particular name, derive from a particular class, have a dependency relationship of any kind with classes from another namespace or use a particular communication protocol (e.g., HTTP, DCOM, Remoting, CORBA, RMI, etc.) and so on. Queries may provide a powerful and easily defined means by which program elements can be associated with the model elements of the layer diagram. For example, including all the classes in a particular namespace that inherit from a particular class and call a specific method on a particular library would be a difficult task using drag and drop user gestures, however may be an easy task using a query.

Physical artifacts to be directly linked to a model element may be selected by user gestures including but not limited to drag-and-drop operations. Physical artifacts from a hierarchical visualization of code elements and files (e.g., using Solution Explorer) can be directly associated with the model elements in the diagrams. The diagram designer can associate physical artifacts with the architectural elements in the diagrams when the diagram designer generates a diagram.

Physical artifacts can be in directly linked to a model element by linking a model or model element to a model element of a diagram. That is, model elements on a diagram may be linked or associated with other models and/or model elements such as models/model elements 122. For example, a user may chose to associate a model element such as a layer or component with another model element or model that is linked to single physical artifact or a set of physical artifacts. A user may choose to associate a model element of a diagram with one or more model elements on another diagram. Hence, although eventually a physical artifact or group of artifacts will be pointed to, a level of indirection may exist in the linking. For example, a component model element on a component diagram may be associated with a layer represented in an architecture diagram, where the component itself represents a physical project in the solution.

Rules and constraints to be applied to the modified architecture diagram may be developed and stored in rules data store 108 so that it can be determined if the codebase is actually structured according to and conforms to the specified rules. Examples of rules include but are not limited to:

"Layer A should not use or communicate with layer B".
"Layer A can use and can communicate with layer C."
"Every class in Layer A must belong to namespace X."
"No class in Layer A can belong to namespace Y."
"Every class in Layer A must follow the naming convention Z."

When the rules and constraints have been established, the architecture diagrams can be validated by running the validator 114 (e.g., validation software) on the physical artifacts associated with the model elements in the diagram(s), applying the specified rules. Validation software may include any standard and/or extensible validation frameworks.

When the validator 114 (e.g., validation software) is run on the physical artifacts associated with the model elements of the architecture diagrams applying the rules represented in the diagrams, a report of possible issues, or constraint violation, e.g., validation results 110, may be generated. Work items can be generated for the development team from the items appearing on the report. It may be possible to refactor existing architecture to develop the proposed or target architecture, or it may not be possible to refactor existing architecture to develop the proposed or target architecture. Examples of validation errors may include: code that takes unallowable dependencies, code elements exist that are not assigned to a layer, code elements may not be in the correct namespace and so on. The process described can be repeated one or more times, or iterated to evolve towards a target architecture. The errors or issues exposed by the report may be corrected by refactoring the software, that is, by changing the codebase so that the rules and constraints are followed to make the codebase accommodate a target goal. For example, if a class in a presentation layer is communicating with a class in a data access layer, and this is not desired, refactoring may include breaking a link between the presentation layer and the data access layer. The introduction of new classes may be required. As development of the target software continues, to insure that the rules are still being followed as the code is changed, the validation process may be run whenever a build is initiated or at other specified times. The validation process may be automated by scheduling it to run automatically whenever a build is done, whenever code is checked into a source code control system or whenever an architecture diagram is modified in the diagram designer.

Figure 1B:
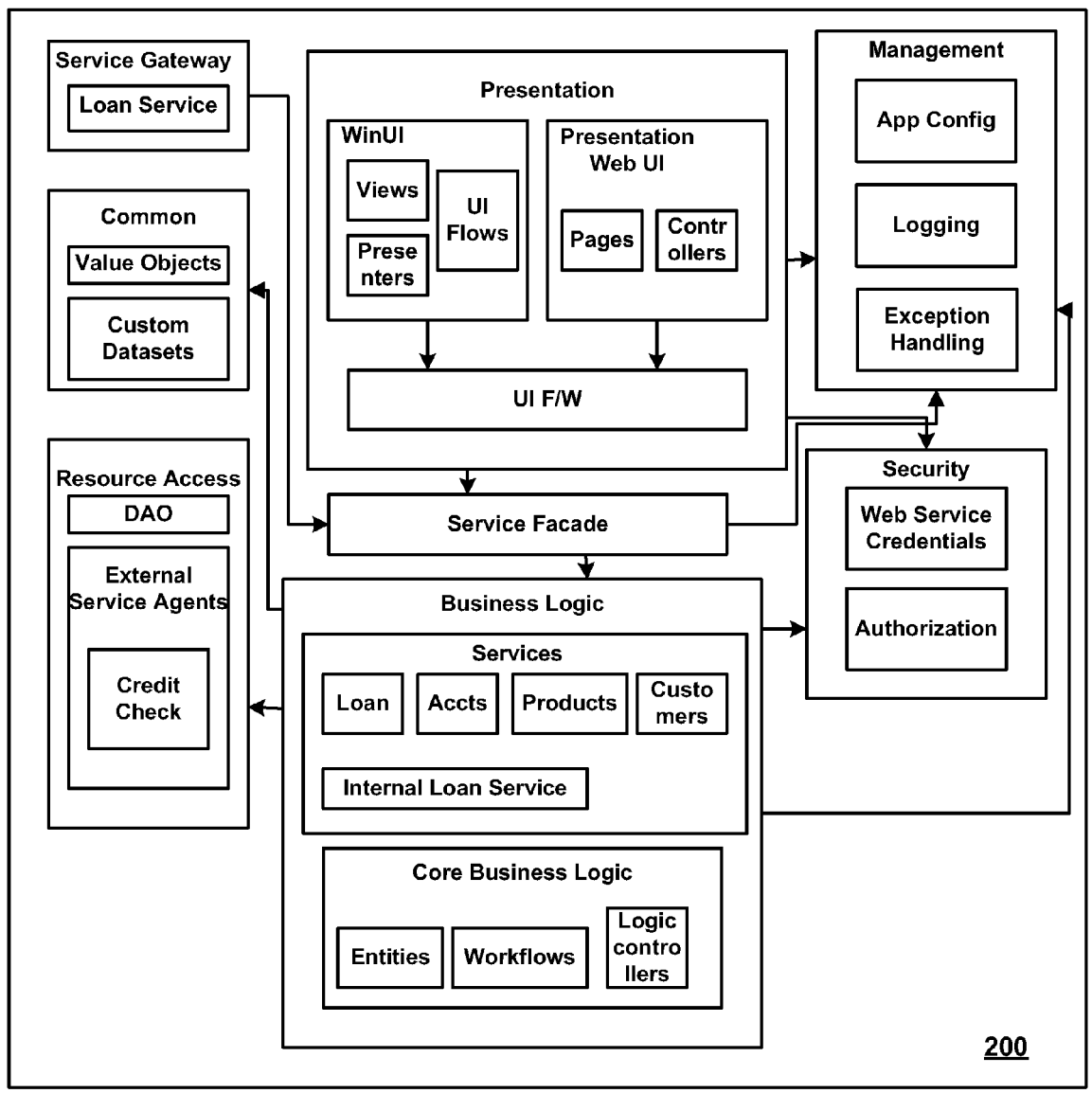
FIG. 1b is an example of a layer diagram that may be created using the system of FIG. 1a in accordance with aspects of the subject matter disclosed herein.

FIG. 1b illustrates an example of a layer diagram 200. It will be appreciated that FIG. 1b is presented as an illustrative example not a limiting one. While in FIG. 1b, a layer diagram is presented, it will be appreciated that any type of architecture diagram representing any type of architectural or model element is contemplated.

Figure 2:
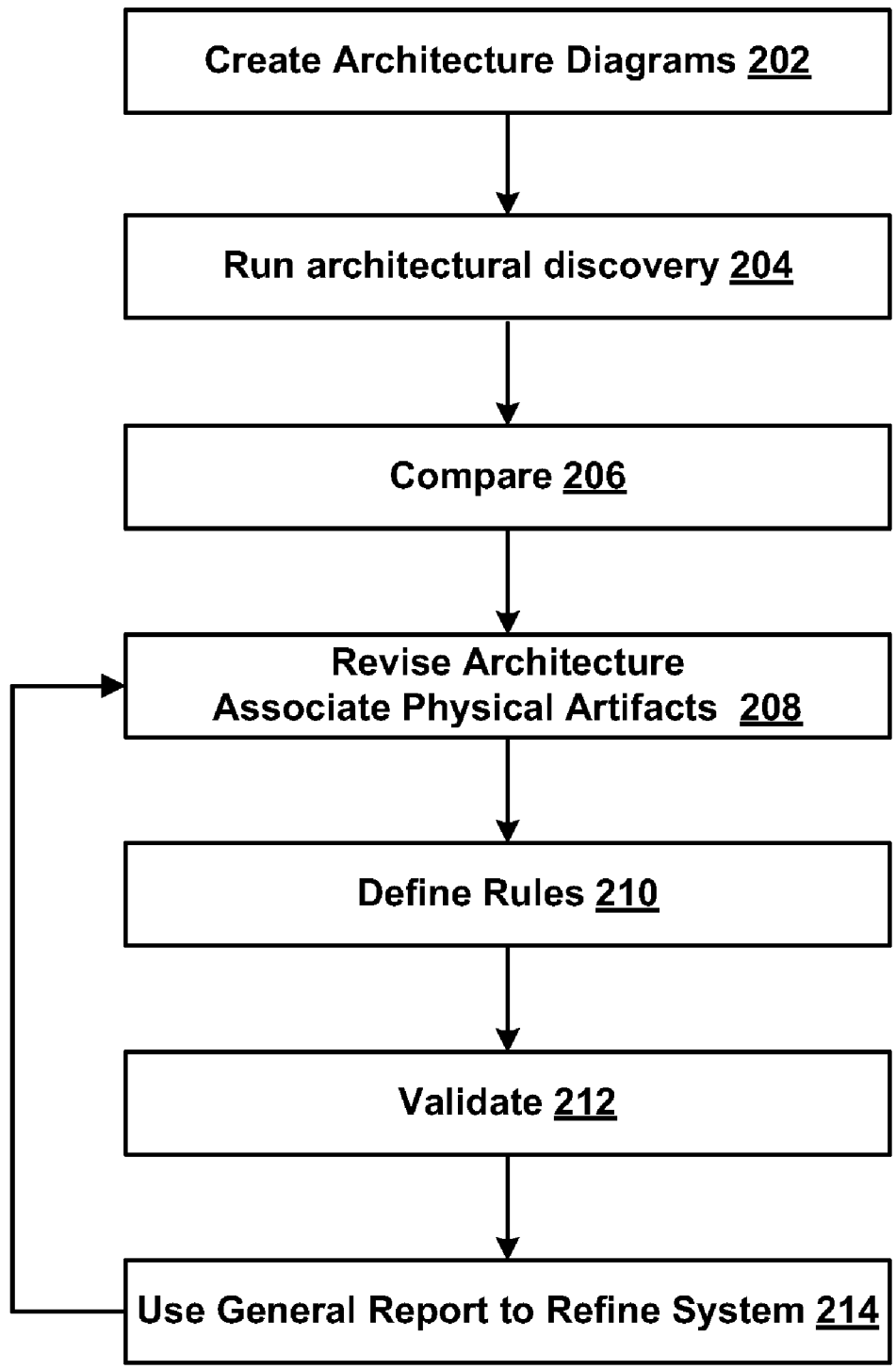
FIG. 2 is a flow diagram of an example of a method for evolving the architecture of a software application in accordance with aspects of the subject matter disclosed herein.

FIG. 2 illustrates a method for creating a set of architecture diagrams modeling the logical architecture of an application or software system in accordance with aspects of the subject matter disclosed herein. At 202, optionally, a diagram designer such as diagram designer 102 of FIG. 1a described above can be used by a user such as a system architect, development team leader, programmer or other user (collectively, the participants) to create one or more architecture diagrams comprising a set of architecture diagrams that represent what is believed to be the logical architecture of an existing application or software system. Existing documentation as well as information known by the participants may be used to create this set of architecture diagrams.

At 204 an architectural discovery system (e.g., architecture discovery software such as Solution Explorer, etc.) may be optionally run on an existing codebase to determine the actual architectural composition of the codebase, generating architectural information such as that described above with respect to reference numeral 112 of FIG. 1a. The architectural discovery system may generate information about physical artifacts and/or models and model elements including but not limited to classes, namespaces, attributes of classes, documents, projects and so on. The information generated may be exposed to the user in the form of diagrams showing the relationships between the physical artifacts. Various tools can be used to analyze the codebase to determine the actual existing architectural structure, as described above with respect to FIG. 1a. Architectural discovery system 106 may provide information to the diagram designer from which the diagram designer 102 may generate a set of one or more architecture diagrams representing a model of the logical architecture of an existing codebase or set of physical artifacts, where the model elements represented on the diagram are linked to physical artifacts.

At 206 optionally the set of architecture layer diagrams resulting from 204 can be compared to the set of architecture diagrams produced by the layer designer (from 202 above) from input provided by the system architect, etc. using information from the participants and available documentation. Comparison may lead to the realization that the existing application or software system is not architected as was thought, or is not architected in a way that supports the proposed application or software system. If so, the process may end.

At 208 a set of architecture diagrams such as those created at 202 or optionally those created at 204 may be revised or modified, or alternatively, a new set of diagrams may be created using the diagram designer. Physical artifacts can be directly or indirectly associated with or linked to the layers represented by the appropriate set of architecture layer diagrams as described more fully above. Physical artifacts may include physical files, sequence diagrams, component diagrams, portions of program code, code elements, and so on, as described above. Physical artifacts can be associated with the architectural elements in the architecture diagrams, using query statements to identify the physical artifacts to be associated with the layers, by drag-and-drop operations which select and identify the physical artifacts to be associated with the diagrams or by the layer designer when generating an architecture diagram. Physical artifacts may be indirectly associated or linked with the model elements of the diagram by associating a model or model element with the model elements. Physical artifacts may be exposed via a hierarchical visualization of code elements and files (e.g., using Solution Explorer, class browser or other tools). A query can be associated with a particular model element of a diagram. For example, a query can be used to indicate that a particular layer includes the classes that start with a particular name, derive from a particular class, etc.

At 210 rules and constraints to be applied to the modified layer diagram are developed and stored in rules data store 108. Validation may determine if the codebase is actually structured as specified by the rules and conforms to the specified rules.

When the rules and constraints have been established, the target architecture as modeled by the modified set of architecture diagrams can be validated by running validation software on the codebase being developed using the developed rules at 212. Validation software may include standard and extensible validation frameworks.

At 212 a validation report may be generated. When the validator 114 (e.g., validation software) is run using the modified architecture diagrams and the rules for the diagrams, a report of possible discrepancies or issues, e.g., validation results 110, may be created. The items on the report can be used to create work items for the development team so that, for example, the existing architecture can be refactored for the proposed architecture. Examples of validation errors may include: code that takes unallowable dependencies, code elements exist that are not assigned to a layer or other model element, code elements that are not be in the correct namespace and so on. The process of modifying aspects of the architecture diagram to address the constraint violations identified in the report and running the validation report can be repeated or iterated to evolve an existing architecture to a target architecture.

At 214 the report may also be used to evolve the modeled target architecture to an actual target architecture. For example, if a class in a presentation layer is communicating with a class in a data access layer, and this is not desired, refactoring may include breaking a link between the presentation layer and the data access layer and the introduction of new classes may be required. As development of the target software continues, to insure that the rules are still being followed as the code is changed, the validation process may be run whenever a build is initiated, whenever code is checked into a program management system, whenever an architecture diagram is modified in the layer designer or at other specified times.

Example of a Suitable Computing Environment

Figure 3:
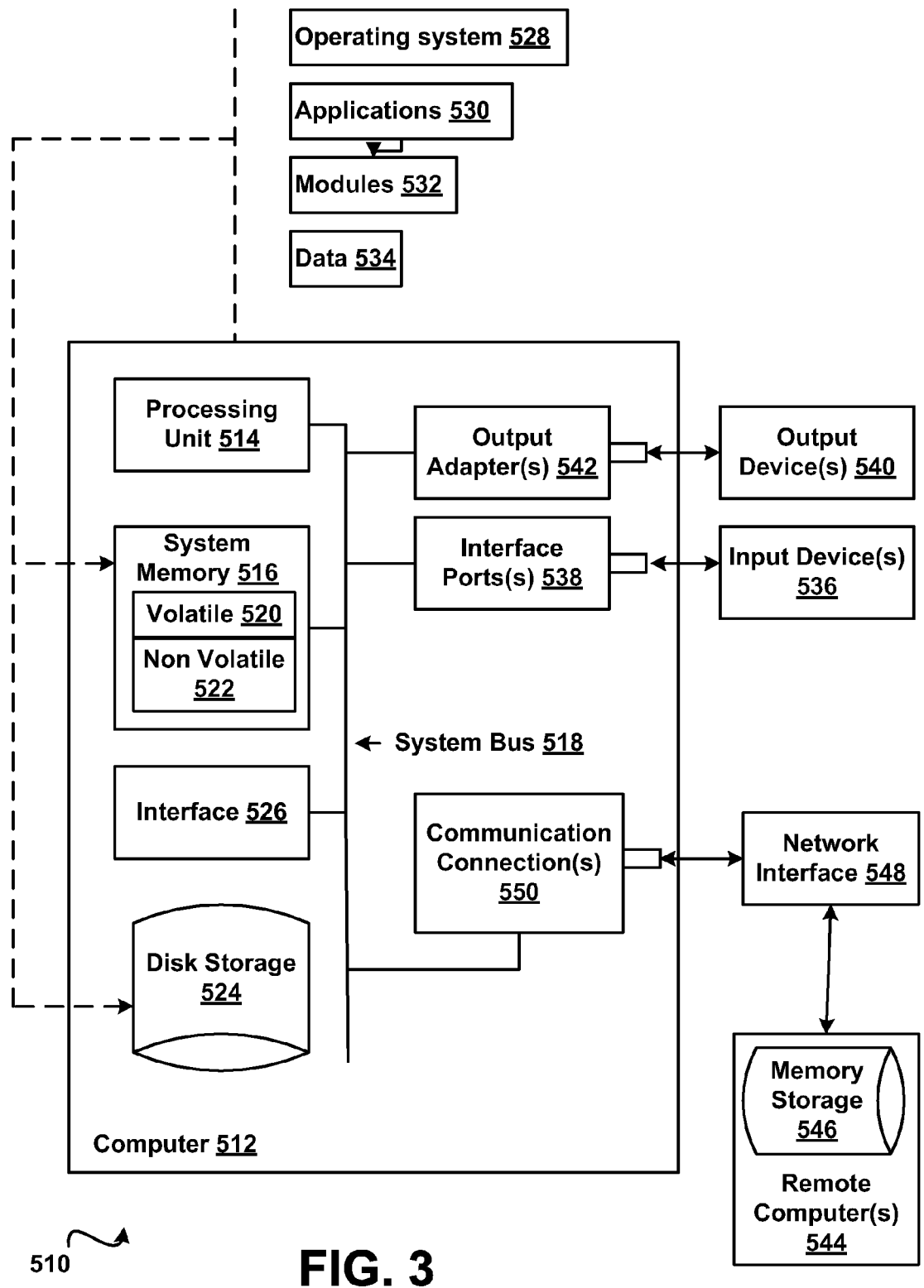
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
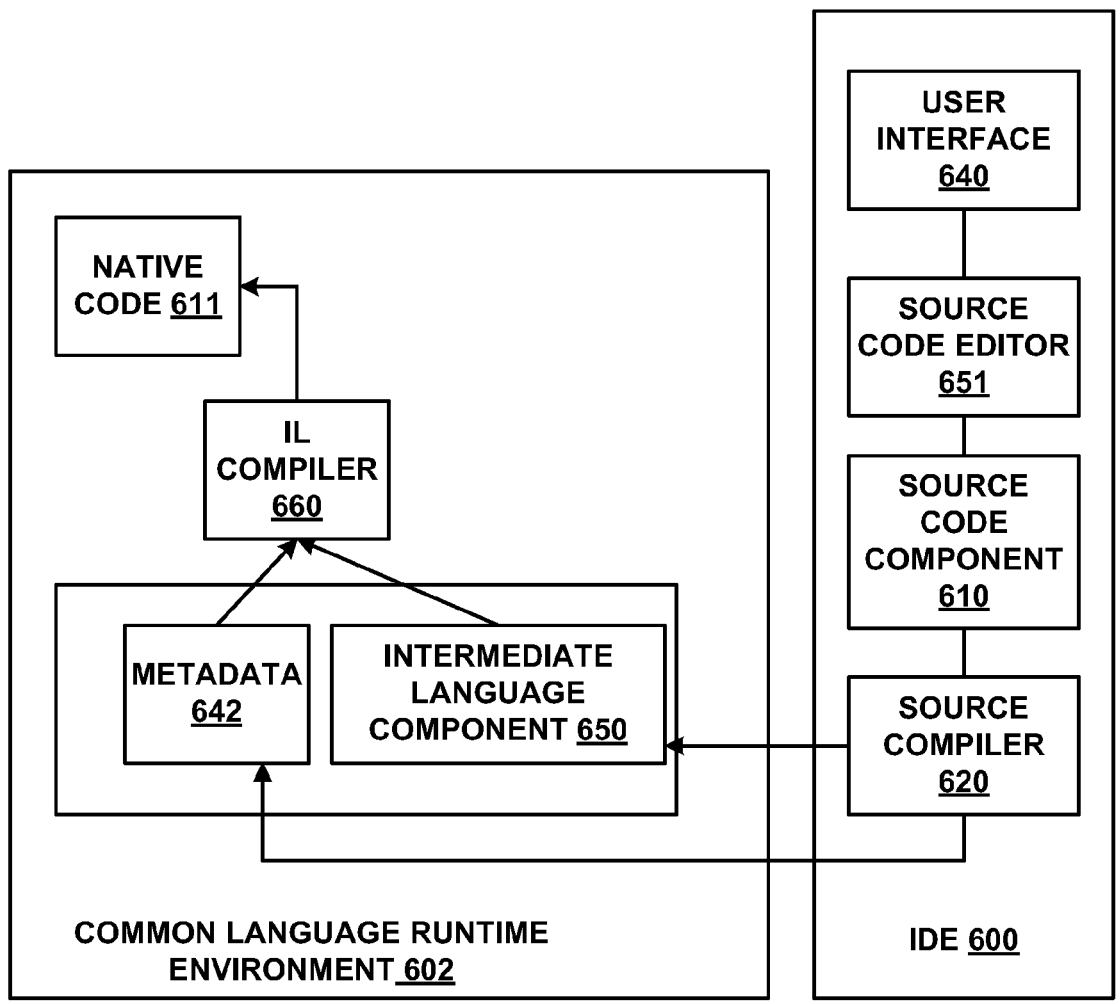
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code environment that runs on a virtual machine. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g. through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system for evolving an architecture of a software application comprising:
   at least one processor operatively coupled to at least one memory providing:
   a diagram designer that:
     receives a user's input to create a first architecture diagram modeling the user's perception of an existing software architecture of the software application;
     applies an architecture discovery system to an existing codebase of the software application to create a second architecture diagram modeling the existing software architecture based on physical artifacts of the existing codebase, the second architecture diagram showing relationship between physical artifacts;
     compares the first architecture diagram and the second architecture diagram to determine if the existing software architecture is structured in accordance with specified rules;
     responsive to the determination that the existing software architecture is not structured in accordance with specified rules, modifies the second architecture diagram to create a modified architecture diagram evolving towards modeling the target software architecture, and links the physical artifacts to model elements of the modified architecture diagram;
     associates one or more constraints to the physical artifacts linked to the model elements of the modified architecture diagram; and
   a validator that:
     generates a report of violations of one or more constraints associated with the model elements of the modified architecture diagram based on the association of the one or more constraints to the physical artifacts linked to the model elements of the modified architecture diagram, wherein the diagram designer iteratively further modifies the modified architecture diagram based on the report of the violations of the one or more constraints, and the validator iteratively generates the reports of violations of the one or more constraints to enable the diagram designer to evolve an architecture that models the target software architecture, the diagram designer further modifying the previously modified architecture diagram in accordance with the report associated with the previously modified architecture diagram till the report of violations of the one or more constraints indicates no further violations.

2. The system of claim 1, wherein modifications are made to the second architecture diagram or to the model elements or to the physical artifacts based on a report of the violations of the specified rules, using the diagram designer.

3. The system of claim 1, wherein physical artifacts are directly linked to the model element of the architecture diagram by a user gesture performed on physical artifacts identified in the architecture information provided by the architecture discovery system and selected by user using a drag and drop operation.

4. The system of claim 1, wherein the physical artifacts are indirectly linked to the model element of the architecture diagram by linking a model exposed by the architecture discovery system to the model element of the architecture diagram.

5. The system of claim 1, wherein the report of violations further comprises a list of discrepancies between the target software architecture and the existing architecture.

6. The system of claim 1, wherein modifications are further made to the modified architecture diagram based on the report of the violations of at least one user-specified rule to evolve the existing architecture to the target architecture.

7. A method of evolving an existing software architecture to a target software architecture comprising:
   applying a user's input to a diagram designer to create a first architecture diagram modeling the user's perception of the existing software architecture;
   applying an architecture discovery system to an existing codebase to programmatically create a second architecture diagram modeling the existing software architecture based on physical artifacts of the existing codebase, the second architecture diagram showing relationship between physical artifacts;
   comparing the first architecture diagram and the second architecture diagram to determine if the existing software architecture is structured in accordance with specified rules;
   responsive to the determination that the existing software architecture is not structured in accordance with specified rules, modifying the second architecture diagram to create a modified architecture diagram evolving towards modeling the target software architecture, and linking the physical artifacts to model elements of the modified architecture diagram;
   generating a report of violations of one or more constraints associated with the model elements of the modified architecture diagram by applying the one or more constraints to the physical artifacts linked to the model elements of the modified architecture diagram;
   iteratively further modifying the modified architecture diagram based on the report of the violations of the one or more constraints; and
   iteratively generating the reports of violations of the one or more constraints to evolve an architecture that models the target software architecture, by further modifying the previously modified architecture diagram in accordance with the report associated with the previously modified architecture diagram till the report of violations of the one or more constraints indicates no further violations.

8. The method of claim 7, further comprising:
   generating the report of the violations of the one or more constraints to the model elements of the modified architecture diagram, wherein the report of the violations comprises a list of discrepancies between the target software architecture and an actual architecture.

9. The method of claim 7, wherein the physical artifacts are directly associated with the model elements of the modified architecture diagram by selecting the physical artifacts exposed by the architecture discovery system, or wherein the physical artifacts are directly associated with the model elements, wherein a search query performed over a plurality of the physical artifacts identifies the physical artifacts which satisfy the search query, and associating the identified physical artifacts with the model elements.

10. The method of claim 7, wherein the physical artifacts are indirectly associated with the model elements of the modified architecture diagram by selecting a model, wherein the physical artifacts are linked to the model and linking the selected model to the model elements.

11. The method of claim 7, wherein generating the report of the violations of the one or more constraints is performed automatically by scheduling the report to run automatically whenever a build is done, whenever code is checked into a source code control system or whenever an architecture diagram is modified in a diagram designer tool.

12. A volatile or non-volatile computer-readable storage medium comprising computer-executable instructions which when executed cause a computing environment to:
   generate a first architecture diagram using a diagram designer, the first architecture diagram modeling a perception of an existing codebase based on user input;
   generate a second architecture diagram using the diagram designer, the second diagram modeling the existing codebase based on information available from an architecture discovery system provided to the diagram designer;
   display quality metrics relating to the first architecture diagram or the second architecture diagram, the quality metrics facilitating modification of the first architecture diagram or the second architecture diagram;
   modify the first architecture diagram or the second architecture diagram based on the quality metrics to create a modified architecture diagram evolving towards a target software architecture.
   associate physical artifacts with a model element of the modified architecture diagram;
   associate rules and constraints with the model element of the modified architecture diagram;
   generate a report of rules and constraints' violations by applying the rules and constraints associated with the model element to the physical artifacts associated with the model element;
   iteratively further modify the modified architecture diagram based on the report of the violations; and
   iteratively generate the reports of the violations to evolve an architecture that models the target software architecture, by further modifying the previously modified architecture diagram in accordance with the report associated with the previously modified architecture diagram till the report indicates no further violations.

13. The volatile or non-volatile computer-readable storage medium of claim 12, comprising further computer executable instructions, which when executed cause the computing environment to:
   associate physical artifacts with the modified architecture diagram by selecting a physical artifact or a model associated with a physical artifact or a model element associated with a physical artifact selected by a drag and drop operation.

14. The volatile or non-volatile computer-readable storage medium of claim 12, comprising further computer executable instructions, which when executed cause the computing environment to:
   associate physical artifacts with the modified architecture diagram by selecting those physical artifacts, models or model elements that satisfy a query statement.

15. The volatile or non-volatile computer-readable storage medium of claim 12, comprising further computer executable instructions, which when executed cause the computing environment to:
   apply user-specified rules associated with model elements of the modified architecture diagram to the physical artifacts associated with the model elements of the modified architecture diagram.

16. The volatile or non-volatile computer-readable storage medium of claim 15, comprising further computer executable instructions, which when executed cause the computing environment to:
   generate a report of discrepancies between the user-specified rules and the software architecture modeled by the modified architecture diagram.

17. The volatile or non-volatile computer-readable storage medium of claim 16, comprising further computer executable instructions, which when executed cause the computing environment to:
   guide development of the target software architecture by automatically generating the report of discrepancies between the user-specified rules and the architecture modeled by the modified architecture diagram whenever a build is done.

18. The volatile or non-volatile computer-readable storage medium of claim 16, comprising further computer executable instructions, which when executed cause the computing environment to:
   guide development of the target software architecture by automatically generating the report of discrepancies between the user-specified rules and the architecture modeled by the modified architecture diagram whenever code is checked into a source code control system.

19. The volatile or non-volatile computer-readable storage medium of claim 16, comprising further computer executable instructions, which when executed cause the computing environment to:
   guide development of the target software architecture by automatically generating the report of discrepancies between the user-specified rules and the architecture modeled by the modified architecture diagram whenever an architecture diagram is modified in the diagram designer.

20. The volatile or non-volatile computer-readable storage medium of claim 16, comprising further computer executable instructions, which when executed cause the computing environment to:
   illustrate dependencies between model elements, wherein a model element is at least one of a layer, and a component.

* * * * *